March 21, 1933.　　　　F. RIEBER　　　　1,902,183
SYSTEM FOR RECEIVING AND RECORDING VIBRATIONS
Filed May 24, 1927
FIG.1.
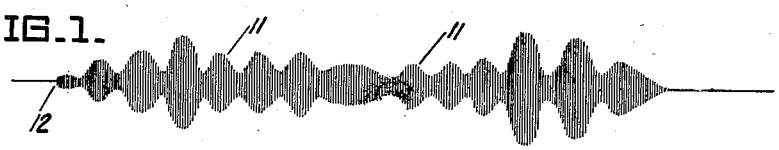
FIG.2.
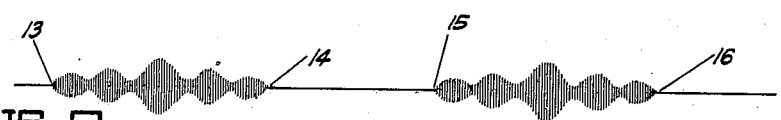
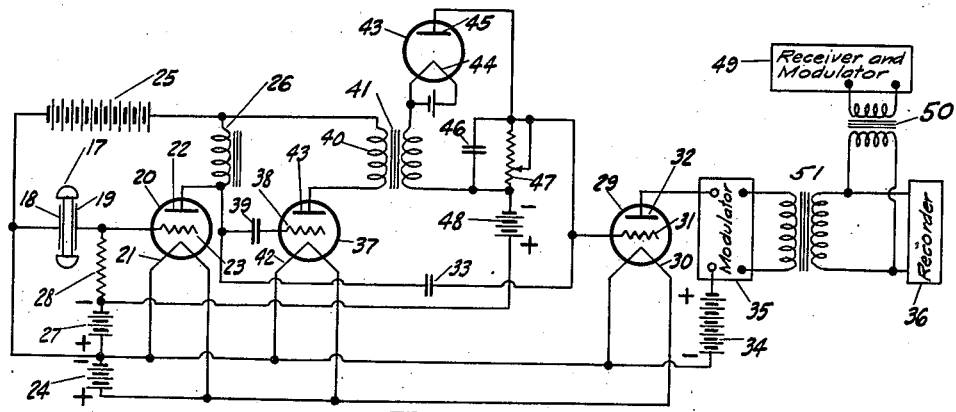
FIG.3.
INVENTOR
Frank Rieber
BY John Flam
HIS ATTORNEY Patented Mar. 21, 1933

1,902,183

UNITED STATES PATENT OFFICE

FRANK RIEBER, OF SAN FRANCISCO, CALIFORNIA

SYSTEM FOR RECEIVING AND RECORDING VIBRATIONS

Application filed May 24, 1927. Serial No. 193,941.

This invention relates to a system of measurement, and particularly to the determination of the time required for a shock or vibration, such as may be imparted to the earth, to arrive at a given point.

This measurement of time is of particular importance in connection with geophysical explorations. For such purposes, shocks or vibrations are imparted to the earth, as by the use of explosives; and the times of arrival after the blast at definite points at a distance from the locality of the explosion, are noted. From this data, a time-travel curve can be plotted; and from this curve can be deduced other useful information as regards the character of the earth strata in the vicinity of the field of operation. This mode of exploration is now well understood and requires no further description.

It is of course to be understood that my invention can as readily be applied to other uses, such as for timing the arrival of shocks from guns for locating batteries in war time.

When shocks are imparted to the earth by explosion, it is an observed phenomenon that a succession of mechanical vibratory waves can be received at a distant point as a result of a single explosion. It is of interest, however, only to discover the time of first arrival. Another object of my invention is to make it possible to suppress all but the first part of the vibrations thus received, so that the record will show only the first group of waves. In this way it is entirely feasible to produce an intelligible single record showing the times of first arrival of the mechanical vibrations at increasingly distant points from the explosion.

In contradistinction to this mode of recording, the prior systems have inherent disadvantages, now to be discussed. It has been possible, for example, to use a plurality of receivers, located at increasingly distant points from the explosion for transforming the mechanical shocks received into electrical vibrations in any well-known way. Then each of these receivers can be connected to a common recorder, such as an oscillograph or a tuned string galvanometer, serving to trace a photographic record on a strip of sensitized material moving at constant speed. Without the aid of my invention, the record from each receiver may and usually would merge into those of the others, making it difficult if not impossible to locate the times of first arrival of the mechanical vibrations at the spaced receivers. With the aid of my invention, each receiver would produce a definite, easily recognizable record separate from the others.

Of course it would be possible to use separate recorders for each receiver, making their records on a common film. But it is evident that this means multiplication of apparatus with its attendant increased cost. Furthermore, it is difficult to build recording apparatus capable of producing more than a few independent records on the same film. Accordingly it is another object of my invention to obviate the necessity for all such complexity.

My invention possesses many other advantages, and has other objects which may be made more easily apparent from a consideration of one embodiment of my invention. For this purpose I have shown a form in the drawing accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing:

Figure 1 is a facsimile of a record that can be made of an earth shock in accordance with the invention described and claimed in my copending application, Serial No. 197,212 filed June 7, 1927, and entitled "Method and apparatus for recording explosive shocks" which has matured into Patent #1,780,567, dated Nov. 4, 1930; but without the aid of my present invention; this figure being used to show how received vibrations persist for a long time after their first arrival, and affect the recorder unless they are rendered ineffective in the manner described herein;

Fig. 2 is a facsimile of a record similar to that of Fig. 1, but illustrating how, with the aid of my invention, a series of distinct and non-interfering records can be obtained with the aid of my invention; and Fig. 3 is a schematic wiring diagram of a receiving system embodying my invention.

In Fig. 1 I show how earth vibrations generated by explosions persist for a long interval, the lines 11 forming groups of waves of varying amplitudes. The persistence of such mechanical vibrations in the earth has been attributed to the fact that the different layers or strata in the earth have varying densities, and do no transmit vibrations at the same speed. Therefore when vibrations are transmitted to them, there will be a first arrival of vibrations as indicated at 12; and then additional arrivals succeed the first arrivals, of vibrations which pass through slower media. It is evident that it is not feasible in this way to record on the same strip, the received vibrations at a plurality of stations, for they would overlap. My invention overcomes the overlapping of the record, even though the vibrations overlap.

Thus the record, in using my invention, can be made to assume the form of Fig. 2. In this figure, one receiver at a definite distance from the explosion, shows at 13 the time of first arrival of the vibrations. The record soon dies down as at 14, even if the mechanical vibrations persist; and therefore another receiver, farther from the explosion, can produce a separate and distinct record, beginning at 15 and ending at 16. In this way, any number of receivers can be combined to affect a single record strip.

The manner in which the receiver is arranged to annul or minimize the effect of persisting vibrations, can be most readily appreciated by the aid of Fig. 3.

In the present instance, I show a scheme for converting mechanical or "sound" waves into electrical waves by the aid of a piezo-electric device 17 that is placed in contact with the earth. One form of such a piezo crystal device is shown and claimed in my copending application, Serial No. 197,211 filed June 7, 1927 and entitled "Vibration sensitive systems". It is sufficient for our present purposes however, to note that this device when affected by vibrations, causes corresponding variations in potential difference between the electrodes 18 and 19 that are placed in contact therewith on opposite sides thereof.

In accordance with my invention, these variations in potential difference are amplified by one or more amplifier stages, and I preferably utilize three electrode electronic emission devices for this purpose. Such an amplifier (usually termed an audion) is shown at 20, and is indicated as including an evacuated vessel in which are enclosed an electron emitting device 21 in the form of a heated filament, a plate or anode 22, and a control electrode or grid 23. The filament 21 can be heated from an "A" battery 24. The mode of operation of such an amplifier is too well-known to require elaboration. The plate 22 is made positive with respect to filament 21 by connecting a "B" battery 25 between these two electrodes. This output circuit can include the large impedance device 26, shown as an iron cored inductance coil. The space current in the tube 20 is strongly affected by the potential differences between the grid 23 and filament 21; and therefore these two electrodes connect respectively to elements 19 and 18 so as to affect the amplifier by the piezo electric device 17. It is also common to provide a grid bias to ensure that the amplifier 20 will operate most favorably. This is accomplished by a source of electric potential 27 connected between the filament 21 and the grid 23; the negative side of this source, which may be a battery, connects through resistance 28 to the grid.

Due to the use of tube 20, there will be produced, across impedance 26, potential differences corresponding to those between electrodes 18 and 19, but of much greater values. These increased values are impressed in this instance upon a succeeding amplifier tube 29. This tube is similar to tube 20, having a filament 30, grid 31, and anode 32. The filament 30 is energized from source 24; and grid 31 is connected, through a stopping condenser 33, with that terminal of the impedance 26 which is nearest plate 22. Potential difference variations in the output circuit of tube 20 are thus caused to affect tube 29. The output circuit of tube 29 includes a "B" battery 34 and connects to a modulator 35 that can be built in accordance with my invention disclosed in the patent heretofore referred to. This modulator causes the vibratory current to assume the compound wave forms of Figs. 1 and 2, facilitating the interpretation of the record. Thence, the oscillations are impressed upon any desirable recorder 36, as through transformer 51.

If no further elements were included in the system, it is evident that persisting vibrations affecting device 17 would all be recorded. However, I arrange further elements in such a way that soon after oscillations start, they cause an automatic blocking of tube 29 so that it can no longer transmit energy to recorder 36. This can be done by impressing a sufficiently large negative potential upon grid 31, relative to filament 30. I shall now describe how such a potential is built up by the oscillations themselves.

An amplifier tube 37 is arranged to be affected by the output circuit of tube 20 in a manner entirely similar to the arrangement just described in connection with tube 29. Thus the grid 38 of this tube is connected through stopping condenser 39, with the plate 22 of tube 20. The output circuit of tube 37 includes plate 43, primary 40 of transformer 41, "B" battery 25, and filament 42. The transformer 41 serves to transmit the amplified vibrations to a rectifier device 43, such as a two electrode tube having a filament 44 and plate 45. The rectified impulses serve to charge, by increments, a condenser 46 that is bridged across an adjustable leak resistance 47 sufficiently high so as to cause condenser 46 to retain its charge for a short time. The condenser 46 thus serves to integrate the energy transmitted to it through tube 43. The potential difference existing across this condenser is available as a grid bias for tube 29; and when the charging of condenser 46 is sufficient, the grid bias is large enough to block tube 29 completely. The grid biasing circuit consists of batteries 27 and 48 and condenser 46. Battery 48 is of such value that when the condenser 46 is uncharged, its negative potential transmitted through resistance 47 to grid 31 is sufficient to produce efficient amplification by tube 29. However, as device 17 is continued to be energized by the earth waves, condenser 46 becomes more and more charged; and since its potential is added to the battery 48, in a short time this charge is sufficient to produce complete blocking of tube 29, and prevention of transfer of energy to recorder 36. When the persistent vibrations cease, the condenser 46 discharges through resistance 47, and the apparatus is thus automatically restored to active condition, and is ready to respond to a succeeding disturbance. By proper adjstment of resistance 47, the interval of interruption of energy transfer between devices 17 and recorder 36 may be set at a desired value.

The recorder 36 can be influenced by other receivers operating substantially as that already described, but placed at a different distance from the explosion. One such additional receiver is diagrammatically indicated at 49, which transmits vibrations to recorder 36 through transformer 50. This recorder can produce a common non-interfering record from all of these receiver circuits.

I claim:

1. In a system of the character described, means for transmitting electrical vibrations, means for recording said vibrations, means responsive to the same vibrations for building up a potential difference, and means utilizing said potential difference for blocking said transmitting means.

2. In a system of the character described, an electronic emission device having a control electrode and an electron emitting electrode, for transferring electrical vibrations, means for conducting vibrations thereto, means affected by the same vibrations for building up a potential difference, and means whereby said potential difference is applied between the control electrode and the electron emitting electrode to block said electronic emission device after an interval sufficient to produce the potential difference.

3. The combination as set forth in claim 2, with the addition of means for adjusting the interval during which said device is blocked.

4. In a system of the character described, an electronic emission amplifier device having a control electrode and an electron emitting electrode, for transferring electrical vibratory energy, means for conducting vibrations thereto, means including a rectifier and a condenser for building up across the condenser terminals, a potential difference by the aid of successive charges derived from the said conducting means, and means whereby said potential difference is impressed between the control electrode and the electron emitting electrode to block said electron emission amplifier after an interval and thus to prevent its transferring energy.

5. In a system for recording earth vibrations at a plurality of spaced points, a receiver for converting the vibrations into recordable form located at each of said points, a common recorder affected by all of said receivers, and means ensuring that the impulses received by the receivers do not overlap in the recorder, comprising means limiting the interval of energy transfer between each receiver and the recorder.

6. In a system for recording earth vibrations at a plurality of spaced points, a receiver for converting the vibrations into electrical vibrations located at each of said points, a common recorder for all of said receivers, means associated with each receiver for transferring energy to said recorder, and means for blocking said transfer after an interval, comprising a condenser integrating the charges imparted thereto by the vibrations received by the receiver, and means whereby the potential difference of the condenser is utilized to block said energy transfer.

7. In a system for recording earth vibrations at a plurality of spaced points, a receiver for converting the vibrations into electrical vibrations located at each of said points, a common recorder for all of said receivers, an electronic emission amplifier associated with each receiver for transferring energy to said recorder, and means for interrupting the flow of energy between the amplifier and the recorder, after an interval so as to prevent the records from the receivers from overlapping, comprising means connected with each receiver to rectify vibrations passing to said means, and a condenser at each receiver charged by said rectified vibrations, said condenser serving to pass a blocking potential difference to the amplifier.

8. In combination, means sensitive to earth vibrations and adapted to convert the same into electrical vibrations, means for transferring the electrical energy from the said converting means to recording means, and means actuated by the arrival of continued and successive earth vibrations whereby the transfer of energy from said converting means to said recording means may be interrupted.

9. The combination as set forth in claim 8, with the addition of means for adjusting the interval of interruption to any desired value between the limits of operation.

10. The method of controlling the effective period of reception of a train of sound waves, which comprises converting the sound waves into corresponding electrical vibratory energy, and dividing said energy between two electrical paths, storing the energy in one path to build up a predetermined potential, and stopping the flow of energy in the other path when the predetermined potential is built up.

11. The method of controlling electrical energy in the form of electrical vibrations, which comprises amplifying said energy, storing energy in accordance with said vibrations, and electrically blocking the amplification after a predetermined energy is stored.

In testimony whereof I have hereunto set my hand.

FRANK RIEBER.